(12) United States Patent
Wu et al.

(10) Patent No.: US 8,772,637 B2
(45) Date of Patent: Jul. 8, 2014

(54) CABLE PROTECTION DEVICE AND CABLE HAVING THE SAME

(75) Inventors: Ching-Horng Wu, Taoyuan County (TW); Sheng-Hua Li, Taoyuan County (TW); Chia-Jung Liu, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 207 days.

(21) Appl. No.: 13/542,533

(22) Filed: Jul. 5, 2012

(65) Prior Publication Data

US 2013/0081847 A1    Apr. 4, 2013

(30) Foreign Application Priority Data

Sep. 29, 2011    (TW) .............................. 100218243 A (51) Int. Cl.
*H02G 3/06*    (2006.01)

(52) U.S. Cl.
USPC ................. 174/91; 174/84 R; 174/88; 174/93

(58) Field of Classification Search
USPC ...................................... 174/84 R, 88, 91, 93
See application file for complete search history.

(56) References Cited

U.S. PATENT DOCUMENTS

| | | | | |
|---|---|---|---|---|
| 3,459,873 A | * | 8/1969 | Harris et al. ..................... | 174/86 |
| 4,015,329 A | * | 4/1977 | Hutchison ........................ | 29/858 |
| 4,547,623 A | * | 10/1985 | Van Brunt et al. ............ | 174/359 |
| 5,502,280 A | * | 3/1996 | Rocci et al. ................. | 174/84 R |
| 5,760,332 A | * | 6/1998 | Rocci et al. ................. | 174/84 R |
| 5,998,736 A | * | 12/1999 | Rumsey ...................... | 174/84 R |
| 6,559,383 B1 | * | 5/2003 | Martin ........................ | 174/84 R |

* cited by examiner

*Primary Examiner* — Jeremy C Norris
*Assistant Examiner* — Sherman Ng
(74) *Attorney, Agent, or Firm* — Muncy, Geissler, Olds & Lowe, P.C.

(57) ABSTRACT

The present invention provides a cable protection device and a cable having the same. The cable protection device is configured for connecting two cables and includes a first protective casing and a second protective casing assembled with the first protective casing. The first protective casing has a hollow body for allowing one of the two cables to be disposed through. The second protective casing has a hollow body for allowing the other of the two cables to be disposed through. The interiors of the hollow body of the first protective casing and the hollow body of the second protective casing form a protective space respectively for covering a connecting portion of the two cables. Thus, the present invention also generates waterproof and dustproof effects.

16 Claims, 8 Drawing Sheets

CABLE PROTECTION DEVICE AND CABLE HAVING THE SAME

BACKGROUND OF THE INVENTION

1. Field of the Invention

The present invention relates to a cable, and in particular to a cable protection device and a cable having the same.

2. Description of Prior Art

Conventionally, a cable connector is used for connecting two cables serially, such as an AC connector used in a photovoltaic micro-inverter. One end of each cable is provided with a plurality of metallic terminals. In practice, one cable connector (such as a male connector) is electrically connected to the metallic terminals of the one cable. Then, another corresponding cable connector (such as a female cable connector) is electrically connected to the metallic terminals of another cable. By means of the two corresponding cable connectors, the electrical connection between the two cables can be achieved. Although the conventional male and female cable connectors can be assembled with each other to generate an electrical connection quickly, they still have some problems with regard to the waterproof and dustproof capability as well as the protection design for outdoor use. Especially, after a long-term use in an outdoor place, the conventional cable connector has a lot of dust or dirt accumulated on its surface and even suffers damage. However, when the broken or damaged cable connector is replaced, the whole cable may need to be also changed, which increases the difficulty and cost in maintenance.

In view of this, the present Inventor proposes a novel and reasonable structure to solve the above-mention problems based on his expert knowledge and deliberate researches.

SUMMARY OF THE INVENTION

The present invention is to provide a cable protection device and a cable having the same. The cable protection device is capable of sliding along the axial line of the cable for protecting a connecting portion of two cables. Further, the cable protection device is waterproof and dustproof.

The present invention is to provide a cable protection device and a cable having the same. Without changing the cable, the cable protection device can be replaced easily if it gets broken or damaged, which reduces the maintenance cost.

The present invention provides a cable protection device, configured for connecting two cables and including a first protective casing and a second protective casing assembled with the first protective casing. The first protective casing has a hollow body for allowing one of the two cables to be disposed through. The second protective casing has a hollow body for allowing the other of the two cables to be disposed through. The hollow body of the first protective casing and the hollow body of the second protective casing form protective spaces respectively for covering a connecting portion of the two cables.

The present invention provides a cable includes a first cable section, a second cable section and a cable protection device. Both the first cable section and the second cable section have a plurality of core wires on its one end. The distal end of each core wire is provided with a connecting head. The connecting heads of the second cable section are electrically connected to the connecting heads of the first cable section respectively. The cable protection device is disposed at a connecting portion between the first cable section and the second cable section. The cable protection device includes a first protective casing and a second protective casing assembled with the first protective casing. The first protective casing has a hollow body for allowing the first cable section to be disposed through. The second protective casing has a hollow body for allowing the second cable section to be disposed through. The hollow body of the first protective casing and the hollow body of the second protective casing form protective spaces respectively for covering a connecting portion between the first cable section and the second cable section.

DETAILED DESCRIPTION OF THE INVENTION

In order to further understand the characteristics and technical contents of the present invention, a detailed description relating thereto will be made with reference to the accompanying drawings. However, the drawings are illustrative only, but not used to limit the scope of the present invention.

Figure 1:
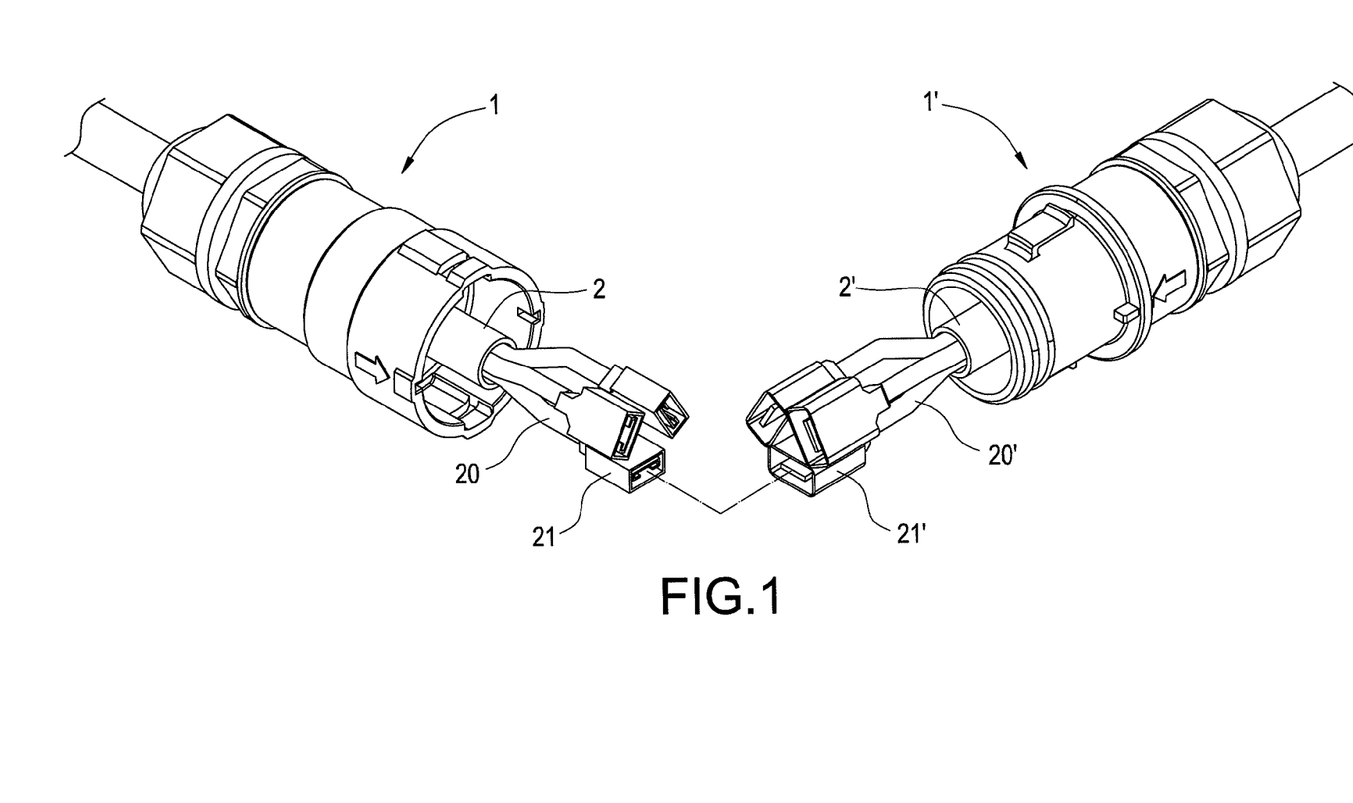
FIG. 1 is a perspective view showing the external appearance of a first embodiment of the present invention.

Please refer to FIG. 1, which is a perspective view showing the external appearance of the first embodiment of the present invention. The present invention provides a cable protection device and a cable having the same. The cable protection device includes a first protective casing 1 and a second protective casing 1' assembled with each other. The first protective casing 1 is configured to allow a first cable section 2 to be disposed through, and the second protective casing 1' is configured to allow a second cable section 2' to be disposed through. In this way, a connecting portion between the first cable section 2 and the second cable section 2' can be covered and protected by the assembly of the first protective casing 1 and the second protective casing 1', thereby generating waterproof and dustproof effects. The first cable section 2 has a plurality of core wires 20 on its one end and connecting heads 21 on the distal ends of the respective core wires 20. Similarly, the second cable section 2' has a plurality of core wires 20' on its one end and connecting heads 21' on the distal ends of the respective core wires 20'. In the present embodiment, each connecting head 21 of the first cable section 2 is a male head, and each connecting head 21' of the second cable section 2' is a female head.

Figure 2:
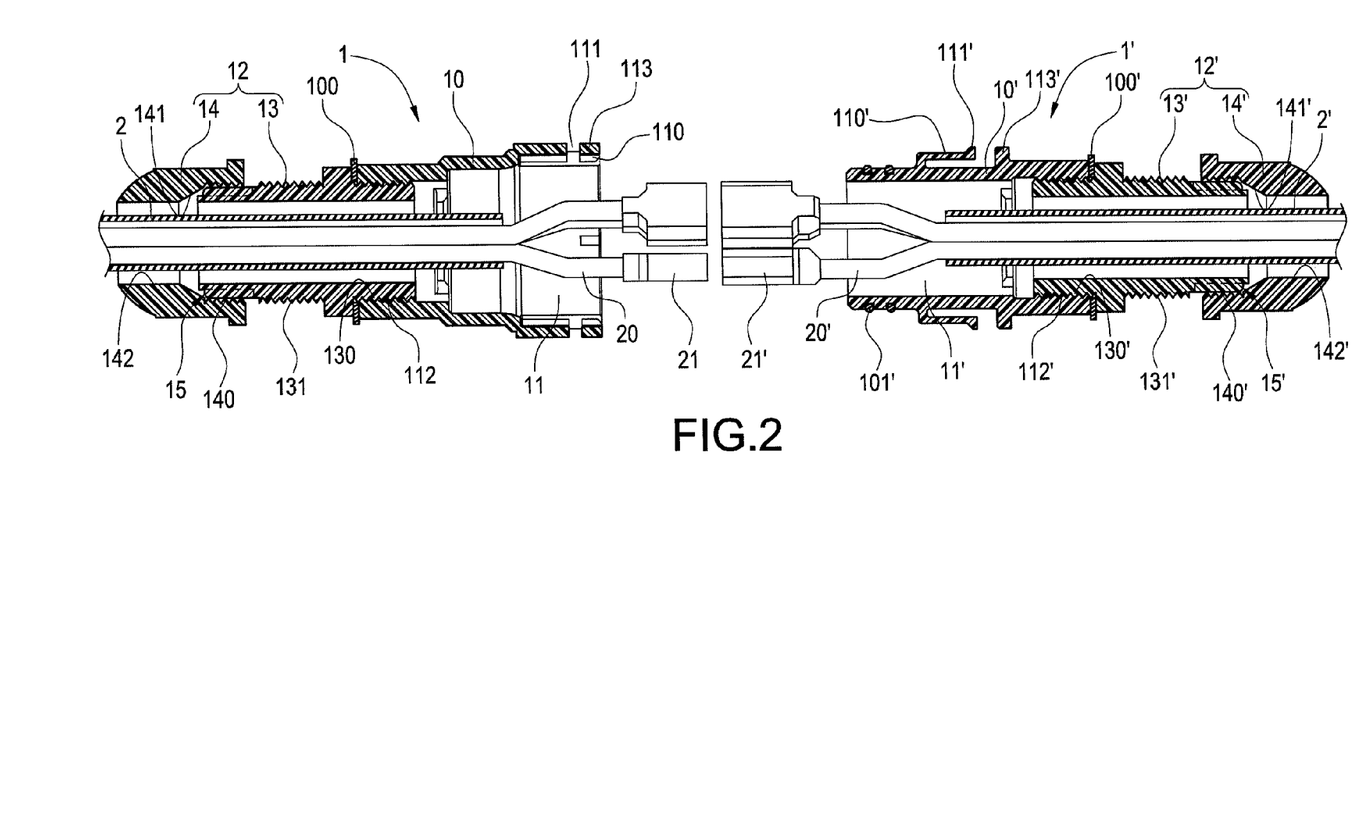
FIG. 2 is a first schematic view showing the assembly of the first embodiment of the present invention.
Figure 3:
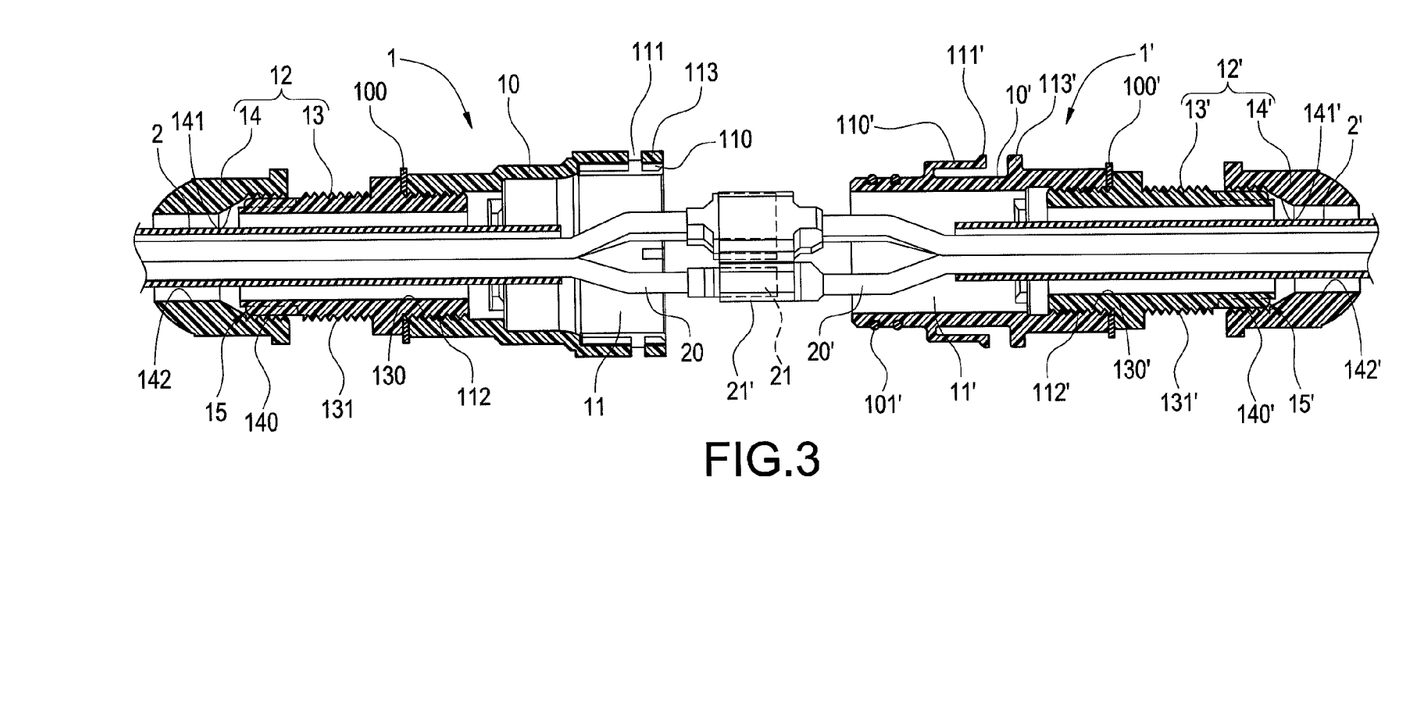
FIG. 3 is a second schematic view showing the assembly of the first embodiment of the present invention.

Please refer to FIGS. 2 and 3. The connection between the first cable section 2 and the second cable section 2' requires the connecting heads 21 of the first cable section 2 to be connected with the connecting heads 21' of the second cable section 2', thereby electrically connecting the core wires 20 of the first cable section 2 to the core wires 20' of the second cable section 2'. In this way, the first cable section 2 can be electrically connected to the second cable section 2'.

Figure 4:
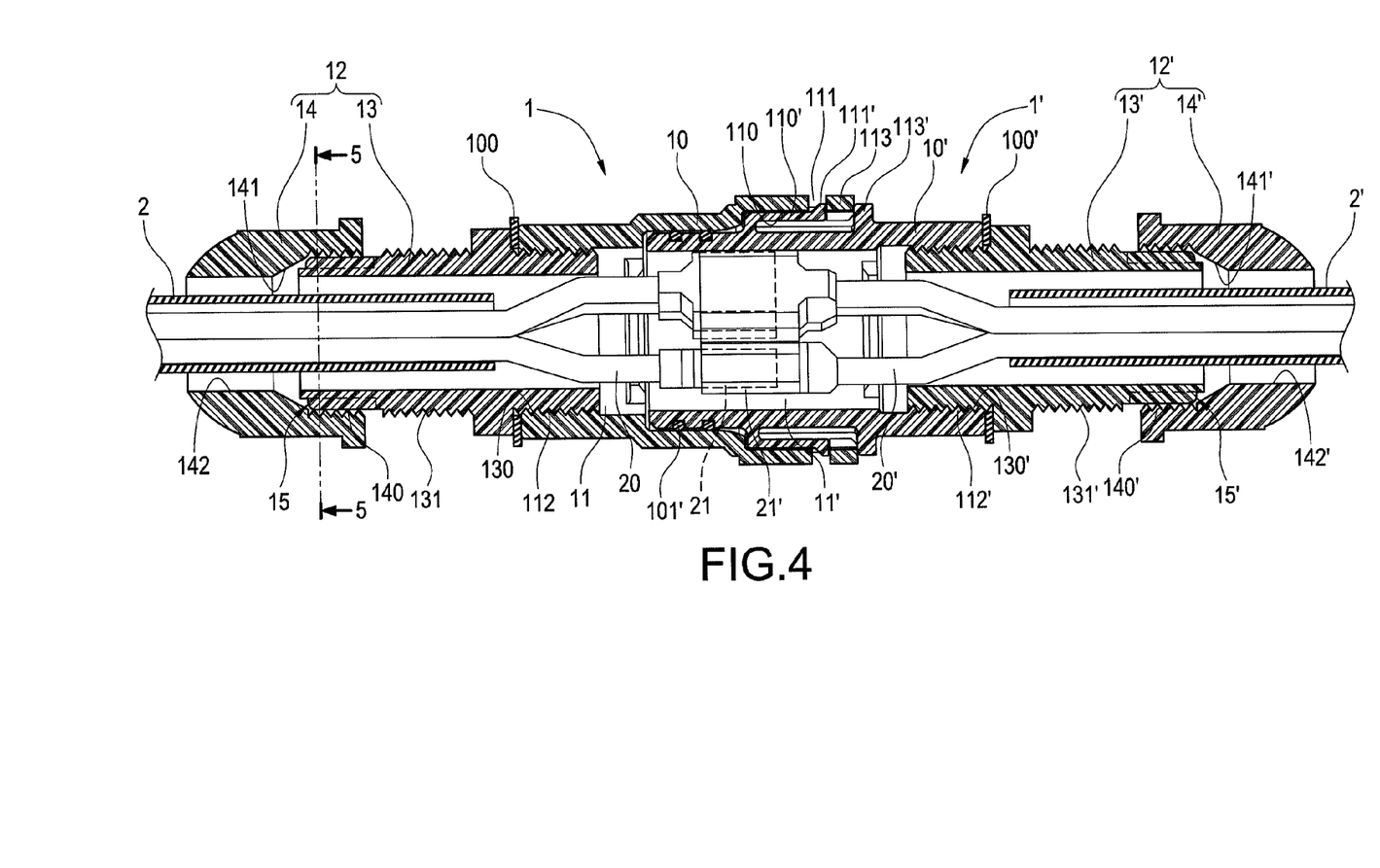
FIG. 4 is a third schematic view (III) showing the assembly of the first embodiment of the present invention.

Next, as shown in FIG. 4, the first cable section 2 is disposed through the first protective casing 1, and the second cable section 2' is disposed through the second protective casing 1'. Then, the first protective casing 1 and the second protective casing 1' slide toward a proper position at which the first cable section 2 and the second cable section 2' are to be connected to each other. The first protective casing 1 has a hollow body 10 for allowing the first cable section 2 to be disposed through, so that the first protective casing 1 can slide along the axial line of the first cable section 2. The second protective casing 1' has a hollow body 10' for allowing the second cable section 2' to be disposed through, so that the second protective casing 1' can slide along the axial line of the second cable section 2'. The interior of the hollow body 10 forms a protective space 11, and the hollow body 10' forms a protective space 11'. Between the protective spaces 11 and 11', the connecting heads 21 of the first cable section 2 are connected with the connecting heads 21' of the second cable section 2'.

According to the above, the first protective casing 1 and the second protective casing 1' are assembled with each other to cover and protect the connecting portion between the first cable section 2 and the second cable section 2'. In the first embodiment, the protective space 11 of the first protective casing 1 is put outside the protective space 11' of the second protective casing 1'. An inner peripheral surface of the front end of the hollow body 10 of the first protective casing 1 is provided with a plurality of insertion troughs 110. An outer peripheral surface of the front end of the hollow body 10' of the second protective casing 1' is provided with a plurality of elastic pieces 110' corresponding to the insertion troughs 110. When the first protective casing 1 is to be assembled with the second protective casing 1', the elastic pieces 110' of the second protective casing 1' can be engaged into the insertion troughs 110 of the first protective casing 1 for fixation. Further, each insertion trough 110 is provided with a through-hole 111, and each elastic piece 110' is provided with an engaging protrusion 111' corresponding to the through-hole 111, thereby increasing the fixing strength and preventing the separation of the first protective casing 1 from the second protective casing 1'. More specifically, the outer peripheral surface of the front end of the hollow body 10 of the first protective casing 1 is formed with tensile portions 113 opposite to the insertion troughs 110 respectively. The hollow body 10' of the second protective casing 1' is provided with a plurality of positioning rings 113' for abutting against the tensile portions 113. When the first protective casing 1 is to be assembled with the second protective casing 1', the positioning rings 113' abut against tensile portions 113 for easy positioning. On the contrary, after the first protective casing 1 is assembled with the second protective casing 1' and both of them are subjected to an external force, the first protective casing 1 is pulled by the external force to move leftward, so that the tensile portions 113 will be blocked by the engaging protrusions 111'. On the other hand, the second protective casing 1' is pulled by the external force to move rightward, so that the engaging protrusions 111' will be blocked by the tensile portions 113. With the mutual reaction between the tensile portions 113 and the engaging protrusions 111, the first protective casing 1 can be tightly assembled with the second protective casing 1' without easy separation.

Figure 5:
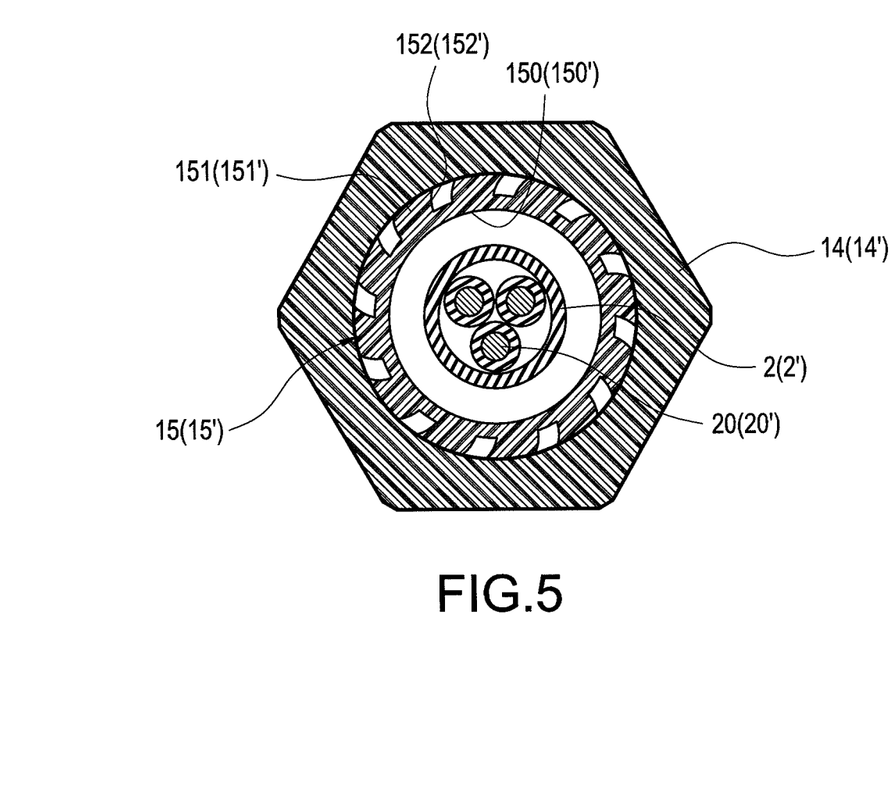
FIG. 5 is a cross-sectional view taken along the line 5-5 in FIG. 4.

As shown in FIGS. 4 and 5, the distal end of the hollow body 10 of the first protective casing 1 is provided with a cable-clamping means 12, and the distal end of the hollow body 10' of the second protective casing 1' is provided with a cable-clamping means 12'. After the first protecting casing 1 slides on the first cable section 2 to a proper position (i.e. the connecting portion between the first cable section 2 and the second cable section 2'), the cable-clamping means 12 is used to clamp the first protective casing 1 and the first cable section 2 for fixation. Similarly, after the second protecting casing 1' slides on the second cable section 2' to a proper position (i.e. the connecting portion between the first cable section 2 and the second cable section 2'), the cable-clamping means 12' is used to clamp the second protective casing 1' and the second cable section 2' for fixation. In this way, the cable-clamping means 12 and 12' can generate waterproof and dustproof effects on the distal ends of the first protective casing 1 and the second protective casing 1'. In the present embodiment, the cable-clamping means 12 of the first protective casing 1 further comprises a connecting sleeve 13 and a pressing sleeve 14. The cable-clamping means 12' of the second protective casing 1' further comprises a connecting sleeve 13' and a pressing sleeve 14'. The front end of the connecting sleeve 13, 13' is connected to the distal end of the hollow body 10, 10'. The front end of the connecting sleeve 13, 13' is provided with outer threads 130 for threadedly connecting into inner threads 112, 112' of the distal end of the hollow body 10, 10'. The pressing sleeve 14, 14' is configured to put around the front end of the connecting sleeve 13, 13'. The connecting sleeve 13, 13' is further provided with outer threads 131, 131' for threadedly connecting into the inner threads 140, 140' of the front end of the pressing sleeve 14, 14'. The distal end of the connecting sleeve 13, 13' is further formed with a flexible sealing ring 15, 15' made of flexible materials. When the pressing sleeve 14, 14' is threadedly connected into the connecting sleeve 13, 13', the tapered inner diameter of the pressing sleeve 14, 14' makes the sealing ring 15, 15' to tightly cover the first cable section 2 or the second cable section 2'. The pressing sleeve 14, 14' has a tapered inner diameter 141, 141' and a pressing diameter 142, 142' extending from the tapered inner diameter 141, 141' to the distal end of the pressing sleeve 14, 14'.

Figure 6:
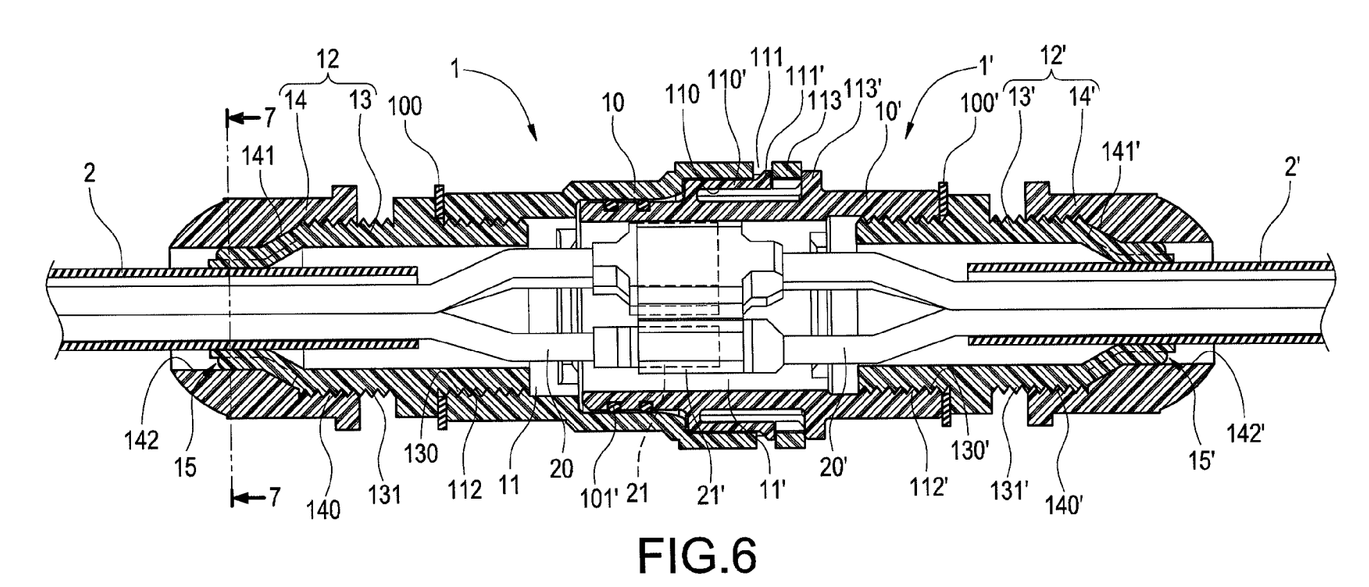
FIG. 6 is a forth schematic view showing the assembly of the first embodiment of the present invention.
Figure 7:
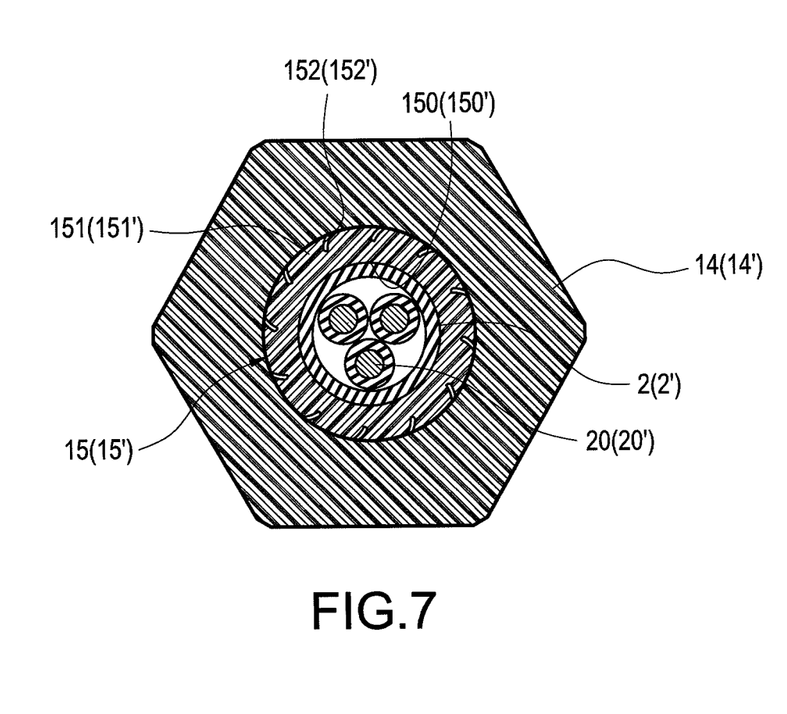
FIG. 7 is a cross-sectional view taken along the line 7-7 in FIG. 6.

As shown in FIGS. 4 and 5, the sealing ring 15, 15' has an annular body 150, 150'. The outer surface of the annular body 150, 150' is provided with a plurality of contracting portions 151, 151' circumferentially protruding there from. A groove 152, 152' is formed between each contracting portion 151, 151'. When the pressing sleeve 14, 14' is not threadedly connected into the connecting sleeve 13, 13', the annular body 150, 150' of the sealing ring 15, 15' is not brought into tight contact with the first cable section 2 or the second cable section 2'. As shown in FIGS. 6 and 7, when the pressing sleeve 14, 14' is threadedly connected to the connecting sleeve 13, 13', since the contracting portion 151, 151' of the sealing ring 15, 15' is compressed by the tapered inner diameter 141, 141' of the pressing sleeve 14, 14', the grooves 152, 152' get closer to generate an inward contraction. As a result, the annular body 150, 150' of the sealing ring 15, 15' tightly covers the first cable section 2 or the second cable section 2' to generate waterproof and dustproof effects. Especially, the pressing diameter 142, 142' of the pressing sleeve 14, 14' increases the contact length or surface area between the annular body 150, 150 and the first cable section 2 or the second cable section 2', thereby improving the airtight, waterproof and dustproof effects. It should be noted that, each contracting portion 151, 151' may be configured to incline toward one side to correspond to the direction in which the pressing sleeve 14, 14' is threadedly connected into the connecting sleeve 13, 13'. For example, in the present embodiment, the pressing sleeve 14, 14' is threadedly connected into the connecting sleeve 13, 13' in a clockwise manner, so that each contracting portion 151, 151' is inclined in a clockwise direction.

A sealing ring 100, 100' is provided between the distal end of the hollow body 10 of the first protective casing 1 and the connecting sleeve 13. Another sealing ring 100' is provided between the hollow body 10' of the second protective casing 1' and the connecting sleeve 13'. A sealing ring 101' is also provided between the hollow body 10 of the first protective casing 1 and the hollow body 10' of the second protective casing 1', thereby improving the airtight, waterproof and dustproof effects.

Figure 8:
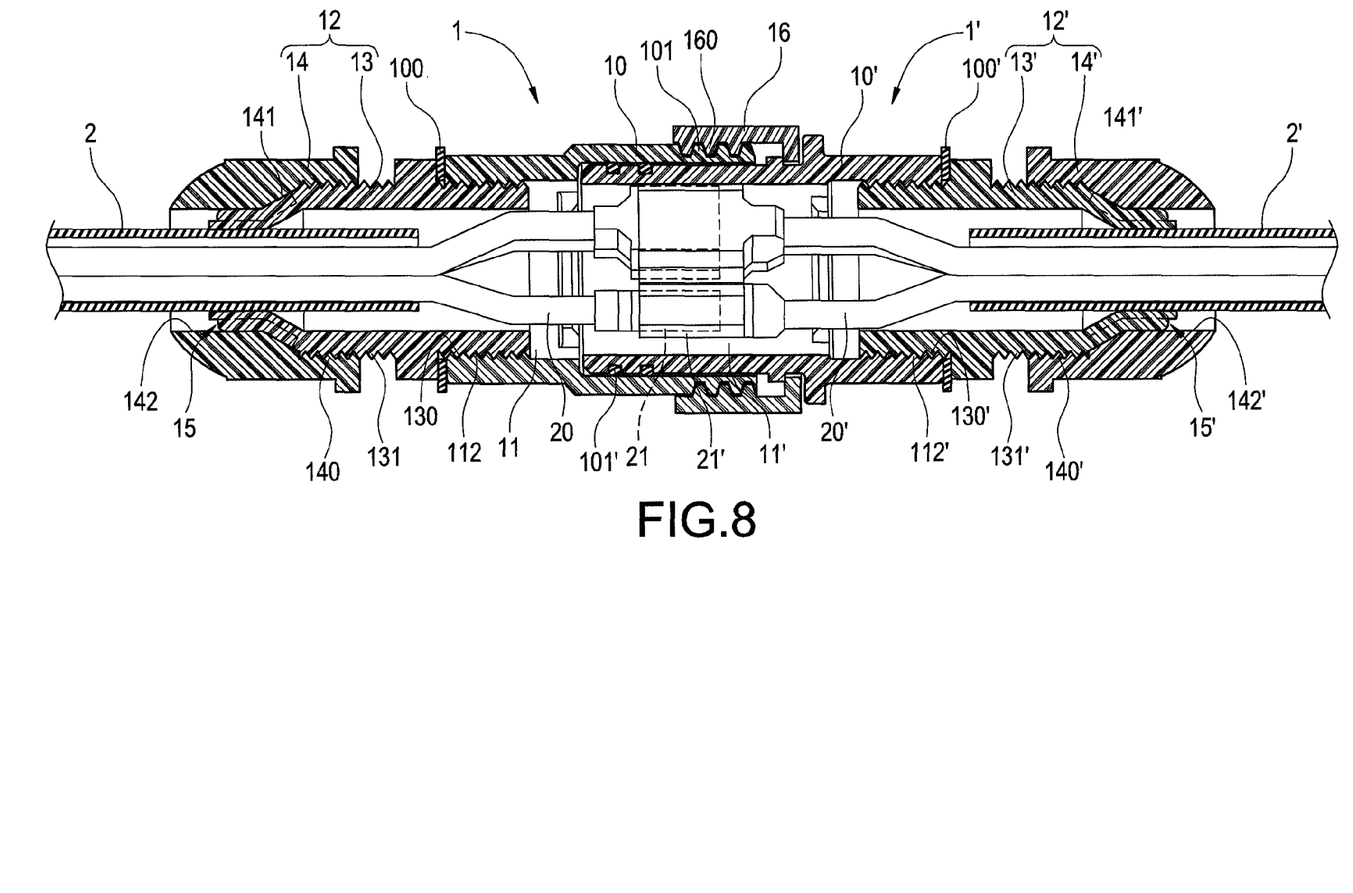
FIG. 8 is an assembled view showing a second embodiment of the present invention.

Please refer to FIG. 8, which is an assembled view showing the second embodiment of the present invention. The outer peripheral surface of the front end of the hollow body 10 of the first protective casing 1 is provided with outer threads 101. The outer peripheral surface of the front end of the hollow body 10' of the second protective casing 1' is pivotally provided with a threaded shroud 16. The threaded shroud 16 is put outside the hollow body 10 of the first protective casing 1. The inner peripheral surface of the threaded shroud 16 is provided with inner threads 160 for threadedly connecting with the outer threads 101 of the hollow body 10 of the first protective casing 1. In this way, the first protective casing 1 and the second protective casing 1' can be assembled with each other.

Thus, according to the present invention, the cable protection device can slide on the axial line of the cable to protect the connecting portion of the cables. On the other hand, since the cable protection device can slide on the cable, replacing a broken or damaged cable protection device can be performed easily without changing the original cable, thereby reducing the maintenance cost.

According to the above, the present invention really solves the problems in prior art and achieves desired objects. Further, the present invention demonstrates novelty and inventive steps, which conforms to the requirements for an invention patient.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A cable protection device, configured to serially connect two cables and including: a first protective casing, having a hollow body for allowing one of the two cables to slide through; and a second protective casing, having a hollow body for allowing the other of the two cables to slide through, the second protective casing being assembled with the first protective casing; wherein the interiors of the hollow body of the first protective casing and the hollow body of the second protective casing are formed with a protective space respectively for covering the connecting portion of the two cables; wherein the protective space of the first protective casing is put outside the protective space of the second protective casing; wherein an outer peripheral surface of the front end of the hollow body of the first protective casing is provided with outer threads, an outer peripheral surface of the front end of the hollow body of the second protective casing is pivotally connected to a threaded shroud, the threaded shroud is put outside the hollow body of the first protective casing, and an inner peripheral surface of the threaded shroud is provided with inner threads for threadedly connecting with the outer threads of the hollow body of the first protective casing.

2. The cable protection device according to claim 1, wherein an outer peripheral surface of the front end of the hollow body of the first protective casing is provided with outer threads, an outer peripheral surface of the front end of the hollow body of the second protective casing is pivotally connected to a threaded shroud, the threaded shroud is put outside the hollow body of the first protective casing, and an inner peripheral surface of the threaded shroud is provided with inner threads for threadedly connecting with the outer threads of the hollow body of the first protective casing.

3. The cable protection device according to claim 1, wherein an outer peripheral surface of the front end of the hollow body of the first protective casing is formed with a tensile portion facing the insertion trough and having a thickness, and the hollow body of the second protective casing is provided with a positioning ring for abutting against the tensile portion.

4. The cable protection device according to claim 1, wherein the distal ends of the hollow body of the first protective casing and the hollow body of the second protective casing are provided with two cable-clamping means respectively, and the two cable-clamping means are fixed to the two cables respectively.

5. The cable protection device according to claim 4, wherein the cable-clamping means of the first protective casing and the second protective casing each comprises a connecting sleeve and a pressing sleeve put around the connecting sleeve, and the distal end of the connecting sleeve is further formed with a sealing ring compressed by the pressing sleeve to generate a contraction.

6. The cable protection device according to claim 5, wherein the pressing sleeve is formed with a tapered inner diameter and a pressing diameter extending from the tapered inner diameter to the distal end of the pressing sleeve.

7. The cable protection device according to claim 5, wherein the sealing ring has an annular body, an outer surface of the annular body is provided with a plurality of contracting portions circumferentially protruding there from, grooves are formed between the contracting portions.

8. The cable protection device according to claim 7, wherein each contracting portion is inclined in a clockwise direction.

9. A cable including: a first cable section, having a plurality of core wires on its one end, the distal end of each core wire of the first cable section being provided with a connecting head; a second cable section, having a plurality of core wires on its one end, the distal end of each core wire of the second cable section being provided with a connecting head, each connecting head of the second cable section being connected with each connecting head of the first cable section; and a cable protection device, disposed at a connecting portion between the first cable section and the second cable section, the cable protection device comprising: a first protective casing, having a hollow body for allowing the first cable section to slide through; and a second protective casing, having a hollow body for allowing the second cable section to slide through, the second protective casing being assembled with the first protective casing; wherein the interiors of the hollow body of the first protective casing and the hollow body of the second protective casing form a protective space respectively for covering the connecting portion between the first cable section and the second cable section; wherein the protective space of the first protective casing is put outside the protective space of the second protective casing, wherein an inner peripheral surface of the front end of the hollow body of the first protective casing is provided with a plurality of insertion troughs, an outer peripheral surface of the front end of the second protective casing is provided with a plurality of elastic pieces, the elastic pieces are engaged into the insertion troughs respectively, each insertion trough is provided with a through-hole, each elastic piece is provided with an engaging protrusion, and the engaging protrusion is engaged into the through-hole.

10. The cable according to claim 9, wherein an outer peripheral surface of the front end of the hollow body of the first protective casing is provided with outer threads, an outer peripheral surface of the front end of the hollow body of the second protective casing is pivotally connected to a threaded shroud, the threaded shroud is put outside the hollow body of the first protective casing, an inner peripheral surface of the threaded shroud is provided with inner threads for threadedly connecting with the outer threads of the hollow body of the first protective casing.

11. The cable according to claim 9, wherein an outer peripheral surface of the front end of the hollow body of the first protective casing is formed with a tensile portion facing the insertion trough and having a thickness, the hollow body of the second protective casing is provided with a positioning ring for abutting against the tensile portion.

12. The cable according to claim 9, wherein the distal ends of the hollow body of the first protective casing and the hollow body of the second protective casing are provided with a cable-clamping means respectively, the two cable-clamping means are fixed to the first cable section and the second cable section respectively.

13. The cable according to claim 12, wherein the cable-clamping means of the first protective casing and the second protective casing comprises a connecting sleeve and a pressing sleeve put around the connecting sleeve, the distal end of the connecting sleeve is further formed with a sealing ring compressed by the pressing sleeve to generate a contraction.

14. The cable according to claim 13, wherein the pressing sleeve is formed with a tapered inner diameter and a pressing diameter extending from the tapered inner diameter to the distal end of the pressing sleeve.

15. The cable according to claim 13, wherein the sealing ring has an annular body, an outer surface of the annular body is provided with a plurality of contracting portions circumferentially protruding there from, grooves are formed between the contracting portions.

16. The cable according to claim 15, wherein each contracting portion is inclined in a clockwise direction.

* * * * *